May 17, 1966 E. M. BAUMAN 3,251,255
FLYING CUTOFF
Filed Aug. 28, 1963 2 Sheets-Sheet 1

INVENTOR.
EARL M. BAUMAN
BY Woodling, Krost, Granger and Rust
ATTORNEYS

May 17, 1966 E. M. BAUMAN 3,251,255
FLYING CUTOFF

Filed Aug. 28, 1963 2 Sheets-Sheet 2

INVENTOR.
EARL M. BAUMAN
BY
ATTORNEYS

United States Patent Office 3,251,255
Patented May 17, 1966

3,251,255
FLYING CUTOFF
Earl M. Bauman, South Euclid, Ohio, assignor to Lee Wilson Engineering Company, Inc., a corporation of Ohio
Filed Aug. 28, 1963, Ser. No. 305,057
9 Claims. (Cl. 83—295)

The invention relates in general to flying cutoff control systems and, more particularly, to a flying cutoff which has a highly accurate repeatability.

Flying cutoffs have been used with many different forms of elongated strip material on processing or manufacturing lines wherein elongated material such as flat ribbons of material or wirelike material must be cut successively into predetermined lengths. For this application, such continuous elongated material shall be called strip material but it will be understood this covers both ribbonlike material and wirelike material. The continuous flow of the striplike material is quite advantageous in most high production manufacturing and processing operations as distinguished from operation on batches, yet for the end product, the strip material usually must be cut into shorter predetermined lengths. This is true whether the end product be steel sheets, shingles, wires to be made into coat hangers or whatever the end product may be.

In order not to waste the strip material and to have uniformity in the end product, it is highly desirable that the predetermined lengths of cutoff strip be held to as close a tolerance as possible. In heavy and tough strip material such as sheet steel, for example, the flying cutoff must be of heavy duty type which necessarily increases the inertia of the flying cutoff device many times. Such high inertia device requires considerable power to start accelerating from rest to reach the speed of the strip material and then is difficult to arrest its motion after the strip material has been cut. The inertia, upon starting, is the most critical as far as determining the exact predetermined lengths of the cutoff material.

Accordingly, an object of the present invention is to provide a flying cutoff which may be carefully controlled to give predetermined lengths of cutoff strip material.

Another object of the invention is to provide a flying cutoff control for a high inertia cutoff device which carefully controls the speed of the flying cutoff in accordance with the speed of the strip.

Another object of the invention is to provide a flying cutoff control which controls the speed and position of the flying cutoff device in accordance with the speed and position of the strip material.

Another object of the invention is to provide a flying shear cutoff control with a means to sense the speed of the strip and a means to sense the speed of the flying cutoff and to control the longitudinal speed of the cutoff in accordance with both of the sensed speeds.

Another object of the invention is to provide a flying shear cutoff control which has a linear motion encoder and decoder to precisely measure the length of the strip material and to control the flying shear cutoff in accordance with the information obtained from the linear motion decoder.

Another object of the invention is to provide a flying shear cutoff control with a feedback means sensing the speed of the carriage of the flying cutoff.

Another object of the invention is to provide a flying shear cutoff control with first and second signals, on establishing the longitudinal motion of a flying shear cutoff and the other controlling the transverse motion of the shear itself and with a variable time period between the two signals.

Other objects and a fuller understanding of the invention may be had by referring to the following description and claims, taken in conjunction with the accompanying drawings, in which:

Figure 1:
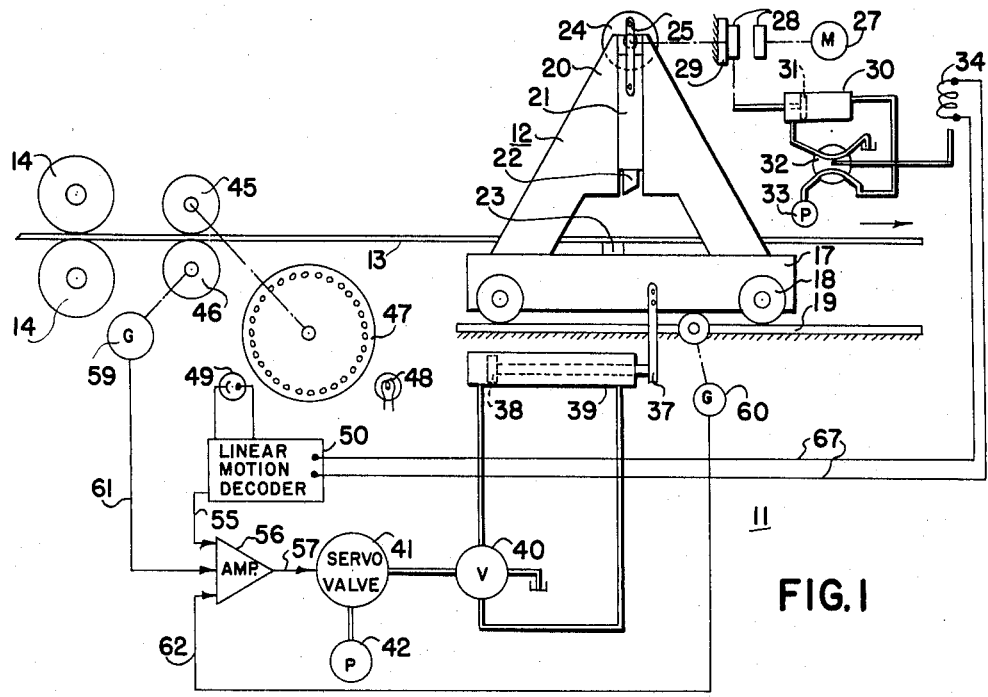
FIGURE 1 is a schematic diagram of a flying shear cutoff control system embodying the invention.

FIGURE 1 shows a flying cutoff control system 11 which controls a flying cutoff schematically indicated at 12 operable to cut strip material 13 as it is moving. The strip material 13 may be any elongated material such as ribbonlike material or wirelike material which is to be cut into predetermined lengths. The flying cutoff control system 11 of the present invention permits the successive cutoff pieces to have extremely uniform lengths, that is, with a close tolerance between successive cutoff pieces.

The strip material 13 may be driven in a continuous manner by any suitable means such as by the drive rolls 14. The flying cutoff 12 is schematically illustrated and includes a carriage 17 which is longitudinally movable along the length of the strip 13. This longitudinal movement has been illustrated as permitted by wheels 18 on the carriage running on a track 19. A frame 20 is mounted on the carriage 17 and carries a transversely movable slide 21. This slide carries a cutoff die 22 which cooperates with a cutoff anvil 23 on the carriage 17 below the strip 13. A flywheel 24 is journalled for rotation on the frame 20 and a crank 25 connects the flywheel 24 and slide 21 to vertically reciprocate this slide 21 to shear the strip 13.

The flywheel 24 is driven from a motor 27 which may be a constantly rotating motor, through a clutch 28. A brake 29 brakes the flywheel 24 when the clutch 28 is disengaged.

A hydraulic cylinder and piston 31 may be connected to actuate the clutch 28 and brake 29. A valve 32 controls hydraulic fluid from a pressure source 33 to control the cylinder and piston 31. The valve 32, in turn may be controlled by a solenoid 34. When the solenoid 34 is actuated, the valve 32 will be moved, the clutch engaged, and the shear die 22 will be vertically or transversely reciprocated to shear the strip material. This mechanism of the flying cutoff may be of large force capabilities, capable of shearing heavy sheets of metal.

The carriage 17 is connected by a link 37 to a hydraulic piston 38 in a cylinder 39. This piston 38 is controlled in movement by a hydraulic valve 40, in turn controlled by a servovalve 40 receiving hydraulic fluid from a pressure source 42. This pressure source 42 may be the same as the pressure source 33, if desired. If the servovalve 41 is actuated, the main valve 40 will be actuated to move the piston 38 to the right as viewed in FIGURE 1 to move the carriage 17 to the right along with the strip material 13.

First and second rollers 45 and 46 are mounted to roll on the strip material 13. The first roller 45 is connected to a linear motion encoder which, in FIGURE 1, is illustrated as a disc 47 having a series of apertures near the periphery. A lamp 48 shines a light beam through these apertures onto a photoelectric cell 49 which is connected to a linear motion decoder 50. The photoelectric cell 49 is a part of the linear motion encoder and receives a definite plurality of impulses per revolution of the first roller 45.

Figure 3:
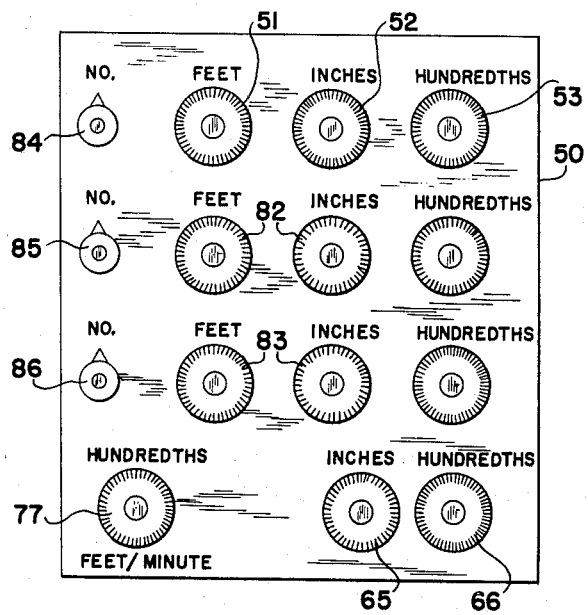
FIGURE 3 is a front view of the control panel of the linear motion decoder; and, FIGURES 4 and 5 are graphs of length vs. time showing operating conditions of the invention.

The linear motion decoder 50 receives these impulses. The decoder 50 may include a counting device and also may include a square wave amplifier to shape the pulses into square waves and feed them to the counter to count these impulses. FIGURE 3 shows a front elevation of the linear motion decoder 50 and it may include a plurality of calibrated dials. A first row of dials includes dials 51, 52 and 53 to set feet, inches and hundredths of an inch, respectively. This row of dials thus presets in the decorder a first given number of pulses. By way of example, let it be assumed that the linear motion encoder 47–49 establishes 600 pulses per foot of travel of the strip 13. If five foot pieces are desired to be cut off, then the dials 51, 52 and 53 would be set at this figure of 5.00 feet. This would establish in the decoder 50 a preset value of 3000 pulses corresponding to the setting of 5.00 feet. This decoder 50 counts the number of impulses coming from the photoelectric pickup device 49 and compares these counted impulses with the present number of pulses set on the dials 51, 52 and 53. Upon equality of these pulses and the impulses, a shear longitudinal command signal is sent out on a channel or conductor 55 to an amplifier 56. This may be a solid state amplifier for rapid dependable action and it amplifies this command signal. The amplifier 56, in turn passes a signal on a channel 57 connected to the servovalve 41 to control same. The amplifier 56 supplies sufficient power to control the servovalve and this, in turn, supplies sufficient amplified power to control the main hydraulic valve 40. This will start the carriage 17 moving along the direction of the moving strip 13.

A tachometer generator 59 is connected to be rotated by the second roller 46 riding on the strip 13. A second tachometer generator 60 is connected to be rotated in accordance with the linear motion of the shear carriage 17. Generator 59 supplies a signal along a channel 61 and generator 60 supplies a signal along the channel 62, both being fed to the amplifier 56. This amplifier is, accordingly, supplied with a first signal from the tachometer generator 59 which is a desired speed signal proportional to the linear speed of the strip. The amplifier 56 is also supplied with a second or feedback signal which is a resultant speed signal proportional to the speed of the carriage 17. The amplifier 56 compares these two speed signals and coordinates, via the servo-valve 41 and valve 40, the speed of the carriage 17 with the speed of the strip 13.

The solenoid 34 is a part of a shear transverse control controlled from the linear motion decoder 50. When the solenoid 34 is actuated, the shear die 22 is actuated to cut off a piece from the strip 13. The linear motion decoder 50 may include dials 65 and 66 calibrated in inches and hundredths of an inch, respectively. These dials set at variable advance signal to preset a given number of pulses in the decoder 50. As an example, this might be an advance signal of 70 pulses equal to 1.40 inches in the above example. This means that a signal is given on conductors 67 leading from the decoder 50 to the solenoid 34, seventy pulses before the longitudinal command signal is given on channel 55. Because the flying cutoff 12 may have a large mass and, hence large inertia, these dials 65 and 66 permit the shear or flying cutoff 12 to be stated a predetermined small length of time prior to the time that the carriage 17 starts its longitudinal movement. This variable advance signal will be dependent on many factors, including the speed of the strip, the mass of the flying cutoff, the inertia of the flywheel 24, the power of cylinder 39, the pressure of source 42 and other factors.

Figures 4, 5:
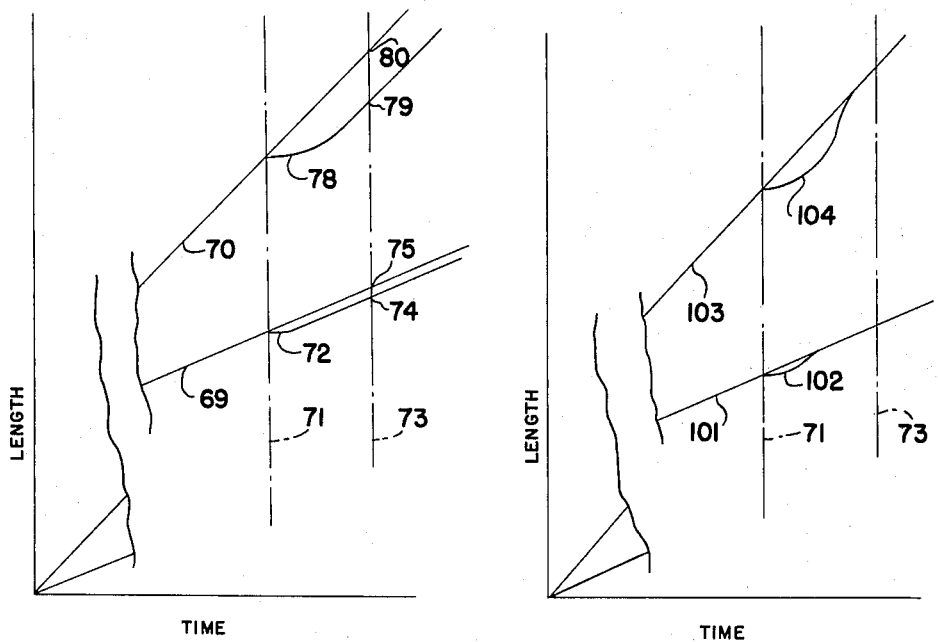

FIGURE 4 helps explain the operation of FIGURE 1. The speed of the strip is shown as a curve 69, as a plot of length or distance vs. time. Another curve 70 is another plot of length vs. time for a higher speed of the strip 13. At a particular time indicated by reference line 71, the longitudinal command signal is given from the decoder 50 on the channel 55. At this instant, the strip is traveling at a given rate, for example, 80 feet per minute. Also, at this instant, the carriage 17 has zero speed. As the valve 40 opens, the hydraulic piston 38 will commence to move to accelerate the carriage 17. This is shown on a curve 72. The tachometer feedback from the tachometer generator 60, as compared with a desired speed signal from tachometer generator 59, automatically controls the amplifier 56 to have the carriage attain the same speed as the strip 13. Accordingly, curve 72 will change direction until it lies parallel to the curve 69. At some point in time, as indicated by the reference line 73, the cutoff of the strip 13 will occur. The intersection of the reference line 73 and curve 72 will be at a point 74. This will be the preset length of the cutoff piece. The intersection of the reference line 73 and curve 69 will be at a point 75 which will be the actual length. These two lengths will be different because of the time taken for acceleration of the carriage 17. The decorder 50 may include a dial 77 which may be calibrated in hundredths of an inch or in feet per minute as desired. For one actual case, it has been found that at a speed of 80 feet per minute of the strip, the difference between the preset length and the actual length was about $\frac{1}{16}$ to $\frac{1}{8}$ of an inch. This, of course, depends upon the many inertia factors set forth above. Accordingly, with this dial 77 set at this small value of $\frac{1}{16}$ or $\frac{1}{8}$ of an inch, this changes the given number of pulses set in the decoder 50 by the dials 51–53. Accordingly, this compensates for the difference between the actual and preset lengths as shown on FIGURE 4 between points 74 and 75. The same thing may be accomplished by setting the dials 51–53 to compensate for this difference although it is more convenient to provide a separate dial 77.

The curve 70 may illustrate a speed of 200 feet per minute, for example, and at the reference line 71, which is the initiation of the longitudinal command signal, a curve 78 will commence which is the plot of length vs. time for travel of the carriage 17. Because of the faster rate of travel of the strip 13, it will take longer for the carriage to reach the speed of the strip 17, at which point curve 78 will be tangent to but displaced from the straight line 70. At the instant of time indicated by reference line 73, the piece will be cut off, at which time the carriage 17 will be moving at the same speed as the strip 13. The intersection of reference line 73 with curve 78 will be at a point 79 and the intersection of reference line 73 with curve 70 will be at a point 80. This represents a greater distance between the actual and preset lengths and the dial 77 will accordingly be adjusted for this higher rate of travel of the strip 13. In one embodiment of the invention actually constructed, the weight of the flying cutoff moved by the cylinder 39 was 1200 pounds with a shear press having a capacity of 85 tons, yet this difference between actual and preset lengths was only about $\frac{3}{16}$ of an inch for the strip speed of 200 feet per minute.

The linear motion decoder 50 may have a second and third row of dials 82 and 83 to control the length of second and third batches of pieces to be cut from the strip 13. The decoder 50 may be provided with means to count the number of pieces out in each of the three batches. The number of pieces cut at the first length may be set on a dial 84 and the second and third numbers of pieces may be set on dials 85 and 86. When the preset number of pieces has been cut in the first batch, the control system 11 will automatically change from the first preset length as determined by dials 51–53 and move to the second preset length as determined by the row of dials 82. After a given number of pieces of this length have been cut off, the machine will change to cutting off pieces of a third length as set by the third row of dials 83. After a preset number of pieces have been cut off at this length, the control system 11 will shut down the machine.

Figure 2:
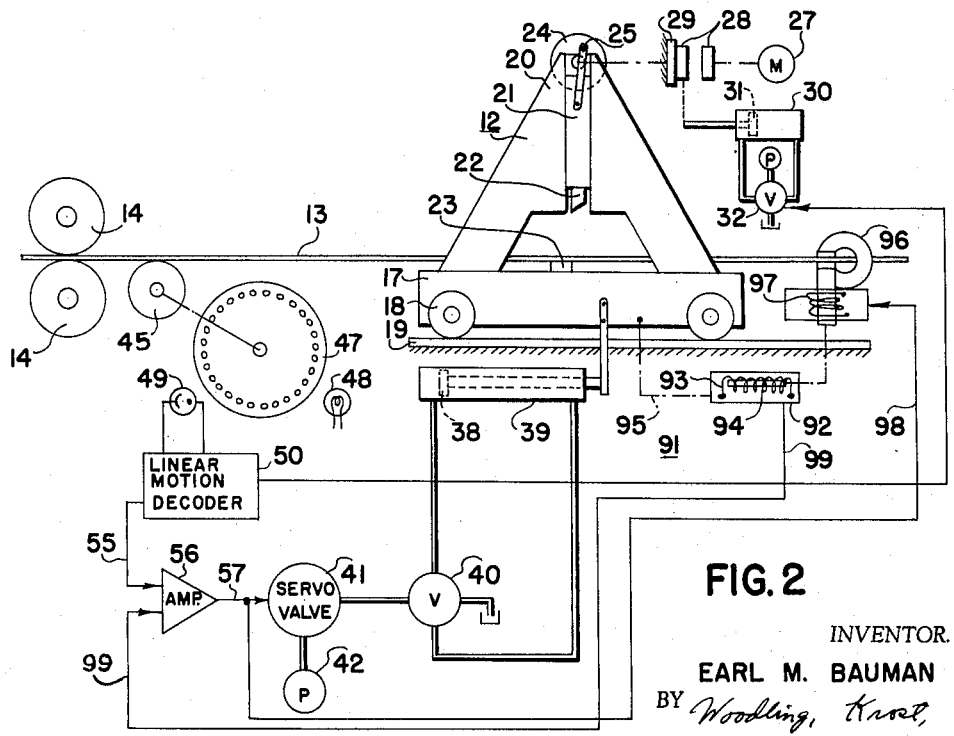
FIGURE 2 is a schematic diagram of a modified form of the invention.

FIGURE 2 illustrates schematically a modified form of the invention illustrating a flying cutoff control system 91. This has many components similar to the control system 11 of FIGURE 1 and similar parts have been given the same reference numerals. A shear linear motion feedback means 92 is provided and may include a saturable core reactor having a winding 93 and a magnetic core 94. The winding 93 is connected by a link 95 to be moved linearly in accordance with movement of the carriage 17. A clamp 96 may be mounted to longitudinally move relative to the rails 19 and this clamp constitutes a clutch actuated by a solenoid 97 to selectively clamp to the strip 13 to move longitudinally therewith. The solenoid 97 is controlled by a channel 98 from the output of the amplifier 56 concurrently with actuation of the servovalve 41. The saturable reactor winding 93 has an output on a channel 99 fed to the input of the amplifier 56.

This control system 91 operates in a manner similar to that described for the control system 11 of FIGURE 1. Upon counting a preset number of pulses from the linear motion encoder 47–49, a longitudinal command signal is initiated on channel 55 amplified by amplifier 56 to initiate longitudinal movement of carriage 17. Also, at the same time, the clamp 96 is actuated so that the saturable reactor core 94 starts movement directly in accordance with movement of the strip 13. Because the flying cutoff 12 may have a mass or inertia 1,000 times or more greater than the mass of the clamp 96, the acceleration of the carriage 17 will be many times slower than the acceleration of the clamp 96 and saturable reactor core 94. This is illustrated in FIGURE 5 on a curve 101 for a low speed of movement of the strip 13. At the instant of time indicated by reference line 71, the longitudinal command signal is given and also the clamp 96 is actuated. As the carriage 17 accelerates, there will be a relative displacement between the core 94 and saturable reactor winding 93. This gives a feedback signal to the amplifier 56 which corrects not only the speed but the displacement of the carriage 17 relative to the speed and displacement of the strip 13. The acceleration of the carriage 17 will be shown by curve 102 and eventually the carriage 17 will attain a speed greater than the speed of the strip 13 and then the rate of acceleration will decrease until the speed of the carriage 17 equals the speed of the strip 13 and also the desired position of the carriage 17 is directly controlled by the actual position of the strip 13. Accordingly, at the reference line 73, when the shearing action occurs, the piece cut off from the strip 13 will be at the desired length.

Curve 103 shows speed of the strip 13 at a higher speed and curve 104 illustrates the acceleration of carriage 17. At this higher speed of the strip 13, it will take longer for the carriage 17 to reach the desired speed and position of a reference point on the strip 13, but, due to the variable delay between reference lines 71 and 73, the carriage 17 may be brought to the desired position at the same speed of the strip at the time of the shearing action.

Upon completion of the shear stroke, a limit switch is actuated by the shear or the carriage 17 to stop the carriage and return it to the starting point, ready for another cycle.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A flying shear cutoff control for a transversely movable shear mounted on a carriage movable along the path of movement of elongated strip material to establish cut pieces of predetermined length, comprising in combination, a linear motion encoder driven from said strip material and supplying a definite plurality of impulses per unit of length,
   a linear motion decoder comprising a counting device counting the impulses,
   means to preset in said decoder a first given number of pulses,
   means to compare the counted impulses with the preset number of pulses and upon equality thereof to produce a shear longitudinal command signal,
   an amplifier to amplify said command signal,
   power means to longitudinally move said carriage,
   means to connect said amplifier to actuate said power means upon receiving said shear longitudinal command signal to move said carriage longitudinally of said strip,
   means connected to be responsive to the speed of said strip and connected to control said amplifier to control the speed of movement of said carriage in direct accordance with the speed of said strip,
   a shear transverse control connected to actuate said shear cutoff to have same cut said strip,
   and means to preset a second given number of pulses in said decoder as a variable advance signal in advance of said longitudinal command signal to supply a shear command signal to said shear transverse control.

2. A flying shear cutoff control for a shear mounted on a carriage movable along the path of movement of elongated strip material to establish cut pieces of predetermined length, comprising in combination, a linear motion encoder driven from said strip material and supplying a definite plurality of impulses per unit of length,
   a linear motion decoder comprising a counting device counting the impulses,
   means to preset in said decoder a first given number of pulses,
   means to compare the counted impulses with the preset number of pulses and upon equality thereof to produce a shear longitudinal command signal,
   power means to longitudinally move said carriage,
   means to actuate said power means upon receiving said shear longitudinal command signal to move said carriage longitudinally of said strip,
   variable impedance magnetic means having two relatively movable parts to vary the impedance thereof,
   and means controlled by said longitudinal command signal to relatively move said two parts of said magnetic means in accordance with relative movement of said strip and carriage to establish length of movement of said carriage in direct accordance with length of movement of said strip.

3. A flying shear cutoff control for a shear mounted on a carriage movable along the path of movement of elongated strip material to establish cut pieces of predetermined length, comprising in combination, a linear motion encoder driven from said strip material and supplying a definite plurality of impulses per unit of length,
   a linear motion decoder comprising a counting device counting the impulses,
   means to preset in said decoder a first given number of pulses,
   means to compare the counted impulses with the preset number of pulses and upon equality thereof to produce a shear longitudinal command signal,
   power means to longitudinally move said carriage,
   means to actuate said power means upon receiving said shear longitudinal command signal to move said carriage longitudinally of said strip,
   a saturable reactor having a movable core and a winding,
   means to move one of said core and winding directly in accordance with movement of said carriage,
   and means controlled in accordance with said longitudinal command signal to move the other of said core and winding directly in accordance with movement of said strip to establish length of movement of said carriage in direct accordance with length of movement of said strip.

4. A flying shear cutoff control for a transversely movable shear mounted on a carriage movable along the path of movement of elongated strip material to establish cut pieces of predetermined length, comprising in combination, a linear motion encoder driven from said strip material and supplying a definite plurality of impulses per unit of length, a linear motion decoder comprising a counting device counting the impulses, means to preset in said decoder a first given number of pulses, means to compare the counted impulses with the preset number of pulses and upon equality thereof to produce a shear longitudinal command signal, an amplifier to amplify said command signal, a hydraulic cylinder to longitudinally move said carriage, a main hydraulic valve to direct flow of oil to said hydraulic cylinder to effect movement thereof, a hydraulic servovalve connected to move said main valve, first means connected to be responsive to the speed of said strip, feedback means connected to be responsive to the speed of said carriage, means to connect said amplifier to actuate said servovalve upon receiving said shear longitudinal command signal to move said carriage longitudinally of said strip, means including said amplifier to control the speed of movement of said carriage in direct accordance with the speed of said strip, a shear transverse control connected to actuate said shear cutoff to have same cut said strip, and means to preset a second given number of pulses in said decoder as a variable advance signal in advance of said longitudinal command signal to supply a shear command signal to said shear transverse control.

5. A flying shear cutoff control for a transversely movable shear mounted on a carriage movable along the path of movement of elongated strip material to establish cut pieces of predetermined length, comprising in combination, a roller rolling on said strip material, a linear motion encoder driven from said roller and comprising a photoelectric pickup device supplying a definite plurality of impulses per revolution of said roller, a linear motion decoder comprising a counting device, said decoder shaping the impulses to produce square waves and counting the impulses, means to preset in said decoder a first given number of pulses.

means to compare the counted impulses with the preset number of pulses and upon equality thereof to produce a shear longitudinal command signal, a solid state amplifier to amplify said command signal, a hydraulic cylinder to longitudinally move said carriage, a main hydraulic valve to direct flow of oil to said hydraulic cylinder to effect movement thereof, a hydraulic servovalve connected to move said main valve, first means connected to be responsive to the speed of said strip, feedback means connected to be responsive to the speed of said carriage, means to connect said solid state amplifier to actuate said servovalve upon receiving said shear longitudinal command signal to move said carriage longitudinally of said strip, means including said amplifier to control the speed of movement of said carriage in direct accordance with the speed of said strip, a shear transverse control connected to actuate said shear cutoff to have same cut said strip, and means to preset a second given number of pulses in said decoder as a variable advance signal in advance of said longitudinal command signal to supply a shear command signal to said shear transverse control.

6. A flying shear cutoff control for a transversely movable shear mounted on a carriage movable along the path of movement of elongated strip material to establish cut pieces of predetermined length, comprising in combination, a roller rolling on said strip material, a linear motion encoder driven from said roller and comprising a photoelectric pickup device supplying a definite plurality of impulses per revolution of said roller, a linear motion decoder comprising a counting device, said decoder shaping the impulses to produce square waves and counting the impulses, means to preset in said decoder a first given number of pulses, means to compare the counted impulses with the preset number of pulses and upon equality thereof to produce a shear longitudinal command signal, a solid state amplifier to amplify said command signal, a hydraulic cylinder to longitudinally move said carriage, a main hydraulic valve to direct flow of oil to said hydraulic cylinder to effect movement thereof, a hydraulic servovalve connected to move said main valve, shear linear motion feedback means including a saturable core reactor having a core and a winding, means to longitudinally move said winding with said hydraulic cylinder, clutch means connecting said core to be moved in direct accordance with movement of said strip, clutch control means to actuate said clutch means, means to connect said solid state amplifier to actuate said servovalve and said clutch control means upon receiving said shear longitudinal command signal to move said carriage longitudinally of said strip with said linear motion feedback means establishing length of movement of said carriage in direct accordance with length of movement of said strip, a shear transverse control connected to actuate said shear cutoff to have same cut said strip, and means to preset a second given number of pulses in said decoder as a variable advance signal in advance of said longitudinal command signal to supply a shear command signal to said shear transverse control.

7. A flying shear cutoff control for a transversely movable shear mounted on a carriage movable along the path of movement of elongated strip material to establish cut pieces of predetermined length, comprising in combination, first and second rollers rolling on said strip material, a linear motion encoder driven from said first roller and comprising a photoelectric pickup device supplying a definite plurality of impulses per revolution of said first roller, a linear motion decoder comprising a counting device, said decoder shaping the impulses to produce square waves and counting the impulses, means to preset in said decoder a first given number of pulses, means to compare the counted impulses with the preset number of pulses and upon equality thereof to produce a shear longitudinal command signal, a solid state amplifier to amplify said command signal, a hydraulic cylinder to longitudinally move said carriage, a main hydraulic valve to direct flow of oil to said hydraulic cylinder to effect movement thereof, a hydraulic servovalve connected to move said main valve, means to connect said solid state amplifier to actuate said servovalve upon receiving said shear longitudinal command signal to move said carriage longitudinally of said strip, a first tachometer generator driven from said second roller and connected to said solid state amplifier to supply a desired speed signal thereto proportional to the linear speed of said strip, a second tachometer generator connected to be moved in accordance with the motion of said carriage and connected to supply a resultant speed signal to said solid state amplifier proportional to the speed of said carriage, means to compare the desired and resultant speed signals from said two tachometer generators to control said servovalve through said amplifier to coordinate the speed of said carriage with the speed of said strip, a shear transverse control connected to actuate said shear cutoff to have same cut said strip, and means to preset a second given number of pulses in said decoder as a variable advance signal in advance of said longitudinal command signal to supply a shear command signal to said shear transverse control.

8. A flying shear cutoff control for a shear mounted on a carriage movable along the path of movement of elongated strip material to establish cut pieces of predetermined length, comprising in combination, a linear motion encoder driven from said strip material and supplying a definite plurality of impulses per unit of length, a linear motion decoder comprising a counting device counting the impulses, means to preset in said decoder a first given number of pulses, means to compare the counted impulses with the preset number of pulses and upon equality thereof to produce a shear longitudinal command signal, power means to longitudinally move said carriage, means to actuate said power means upon receiving said shear longitudinal command signal to move said carriage longitudinally of said strip, means connected to be responsive to the speed of said strip and connected to control said amplifier to control the speed of movement of said carriage in direct accordance with the speed of said strip, and means controlled in accordance with said longitudinal command signal to control the position of said carriage relative to a predetermined length of strip.

9. A flying shear cutoff control for a transversely movable shear mounted on a carriage movable along the path of movement of elongated strip material to establish cut pieces of predetermined length, comprising in combination, a linear motion encoder driven from said strip material and supplying a definite plurality of impulses per unit of length, a linear motion decoder comprising a counting device counting the impulses, means to preset in said decoder a first given number of pulses, means to compare the counted impulses with the preset number of pulses and upon equality thereof to produce a shear longitudinal command signal, power means to longitudinally move said carriage, means to actuate said power means upon receiving said shear longitudinal command signal to move said carriage longitudinally of said strip, a shear transverse control connected to actuate said shear cutoff to have same cut said strip, means to preset a second given number of pulses in said decoder as a variable advance signal in advance of said longitudinal command signal to supply a shear command signal to said shear transverse control, and means to preset a third given number of pulses in said decoder as a compensation signal to advance the timing of said longitudinal command signal to compensate for varying speeds of said strip.

References Cited by the Examiner

UNITED STATES PATENTS

| | | | |
|---|---|---|---|
| 2,425,484 | 8/1947 | Murrah | 318—162 X |
| 2,599,430 | 6/1952 | Beverman | 318—142 X |
| 2,655,994 | 10/1953 | Vandenberg | 318—158 X |
| 2,692,360 | 10/1954 | Wynne | 318—146 X |
| 2,692,361 | 10/1954 | Asbury et al. | 318—142 |
| 2,716,450 | 8/1955 | Micholson | 318—6 X |
| 2,728,040 | 12/1955 | Hunt et al. | 318—371 X |
| 2,785,358 | 3/1957 | Horner | 318—142 |
| 2,799,817 | 8/1957 | Matthes et al. | 318—146 |
| 3,081,657 | 3/1963 | Harris | 83—320 X |
| 3,178,974 | 4/1965 | Roess | 83—76 |

WILLIAM W. DYER, JR., *Primary Examiner.*

ANDREW R. JUHASZ, *Examiner.*

L. B. TAYLOR, *Assistant Examiner.*